US006501087B1

(12) United States Patent
Koretsune et al.

(10) Patent No.: US 6,501,087 B1
(45) Date of Patent: Dec. 31, 2002

(54) IMAGE READING APPARATUS HAVING MULTIPLE WAVELENGTH LIGHT SOURCES AND CONTROL METHOD FOR THE SAME

(75) Inventors: Hideyuki Koretsune, Hyogo (JP); Masaaki Hayashi, Hyogo (JP)

(73) Assignee: Glory Ltd., Hyogo (JP)

( * ) Notice: Subject to any disclaimer, the term of this patent is extended or adjusted under 35 U.S.C. 154(b) by 0 days.

(21) Appl. No.: 09/549,834

(22) Filed: Apr. 14, 2000

(30) Foreign Application Priority Data

Apr. 26, 1999 (JP) .......................................... 11-117748

(51) Int. Cl.[7] ............................................... G06K 11/00

(52) U.S. Cl. ..................... 250/566; 250/208.1; 358/504

(58) Field of Search ................................. 250/566, 226, 250/556, 553, 234, 235, 208.1; 358/504, 509, 513, 514

(56) References Cited

U.S. PATENT DOCUMENTS 4,319,137 A * 3/1982 Nakamura et al. .......... 250/556
4,769,532 A * 9/1988 Kawakami .................. 250/205
6,050,387 A * 4/2000 Iwaki ......................... 194/207
6,188,080 B1 * 2/2001 Voser et al. ................ 250/556

FOREIGN PATENT DOCUMENTS

EP 0 537 513 A1 4/1993
JP 8-12709 2/1996

OTHER PUBLICATIONS

Patent Abstract: Publication No. 06084041, published on Mar. 25, 1994; Application No. 04255659.
Patent Abstract: Publication No. 11086073, published on Mar. 30, 1999; Application No. 09245683.

* cited by examiner

*Primary Examiner*—Robert H. Kim
*Assistant Examiner*—Hoon K. Song
(74) *Attorney, Agent, or Firm*—Ladas & Parry

(57) ABSTRACT

To keep operation of a control circuit for a line sensor reading operation always the same regardless of variations and differences between readers, simplify the control circuit, and avoid complicated processes such as setting various software process parameters for canceling differences between the readers. A line shaped, two-wavelength transmitting LED array and a line shaped light emitting/photodetecting part comprising a photodetector array and a two-wavelength reflecting LED array are disposed in opposition each other such that a read medium passes between the two-wavelength LED array for transmitting light and the light emitting/photodetecting part, and the two-wavelength LED array for tranmitting light and two-wavelength LED array for reflecting light emit light of different wavelengths. An storage time control circuit is disposed in a signal processing circuit of the photodetector array; and a control means is provided for controlling light emission with the two-wavelength transmitting LED array and two-wavelength reflecting LED array, controlling reading with the photodetectors, and controlling the storage time control circuit. Variations in wavelength detection sensitivity and light quantity with different scanned media are adjusted by means of the storage time of the storage time control circuit.

20 Claims, 7 Drawing Sheets

IMAGE READING APPARATUS HAVING MULTIPLE WAVELENGTH LIGHT SOURCES AND CONTROL METHOD FOR THE SAME

BACKGROUND OF THE INVENTION

1. Field of the Invention

The present inventions relate to an image reading apparatus for controlling the storage time of the reading means for banknote (bank bill) identification for each of the multiple wavelength light sources in an image reading apparatus using a multiple wavelength light source, and to a control method for the image reading apparatus.

2. Description of the Related Art

The prior art includes a banknote identification apparatus using an accumulation time control circuit as taught in Japanese Patent Publication (kokoku) No.8-12709. This banknote identification apparatus has a light emitting means for emitting two colors (two wavelengths) of light, a detection circuit for detecting the emission ratio of light from the light emitting means, and four photodetection circuits for detecting light reflected from the banknote. The absolute light quantity is controlled to a constant level and photodetection from the banknote is corrected based on the emission ratio of the two wavelengths of light to identify the banknote.

A problem with the above-noted conventional apparatus is that the banknote cannot be identified with good precision because of variation not only in the light quantity at the light emitting side, but also introduced by the photodetection elements and photodetection signal processing circuit. This is because the photodetector receives the two wavelengths to be detected mixed together, uses a filter to separate the wavelengths at the photodetection side, and instead of being a photodetector that receives reflected light from the actual medium, the photodetector corrects the actual detected light quantity using the detected light quantity of another photodetector.

The technology of a banknote identification apparatus such as described above typically uses light sources of multiple different wavelengths to read transmitted or reflected light as a means of detecting wrinkles and subtle soiling in the watermark of worn or soiled banknote. A problem in this case is that the sensitivity of the photodetection sensor varies according to the wavelength of the light source, and error based on the sensitivity difference results. Furthermore, depending upon whether the banknote being identified is over the sensor or not, the detected light quantity differs significantly when the detecting light passed through the banknote, and high gain is therefore required when reading the banknote. It is also necessary to switch the gain level, and error in conjunction with the degree of amplification occurs.

SUMMARY OF THE INVENTION

The present invention was conceived to resolve the above-mentioned problems. An object of the present invention is to provide an image reading apparatus using a multiple wavelength light source, and a control method therefor, whereby image reading operation (including the line sensor scanning operation and variations in the sensor system) can be always the same regardless of variations and differences between image readers, the control circuit can be simplified, and complicated processes such as setting various software process parameters for absorbing differences between the image readers can be avoided. A further object of the present invention is to eliminate error occurring in conjunction with sensitivity differences if the sensitivity of the photodetection sensor differs according to the wavelength of the light source.

The present invention relates to an image reading apparatus using a multiple wavelength light source and achieves the above noted object of the present invention by disposing a line shaped, a two-wavelength transmitting LED array and a line shaped light emitting/photodetecting part comprising a photodetector array and a two-wavelength reflecting LED array disposed in opposition such that a scanned medium passes between the two-wavelength transmitting LED array and light emitting/photodetecting part, said two-wavelength transmitting LED array and two-wavelength reflecting LED array emitting light of different wavelengths; an accumulation time control circuit disposed in a signal processing circuit of the photodetector array; and a control means for controlling light emission by the two-wavelength transmitting LED array and two-wavelength reflecting LED array, controlling scanning by the photodetectors, and controlling the accumulation time control circuit; wherein variations in wavelength detection sensitivity and light quantity with different read media are adjusted by means of the accumulation time of the accumulation time control circuit.

The above object is further achieved by disposing a line shaped, a two-wavelength transmitting LED array and a line shaped light emitting/photodetecting part comprising a photodetector array and a two-wavelength reflecting LED array disposed in opposition such that a read medium passes between the two-wavelength transmitting LED array and light emitting/photodetecting part, and a signal processing circuit for controlling an accumulation time of the photodetector array when the two-wavelength transmitting LED array and two-wavelength reflecting LED array emit light of different wavelengths.

In addition, the present invention relates to a control method for an image reading apparatus having a line shaped, a two-wavelength transmitting LED array and a line shaped light emitting/photodetecting part comprising a photodetector array and a two-wavelength reflecting LED array disposed in opposition such that a read medium passes between the two-wavelength transmitting LED array and light emitting/photodetecting part, and a signal processing circuit for controlling an accumulation time of the photodetector array when the two-wavelength transmitting LED array and two-wavelength reflecting LED array emit light of different wavelengths, and achieves the above object: by determining an accumulation time when there is no read medium after an automatic adjustment for correcting a rank indicative of the light emission efficiency class of the two-wavelength transmitting LED array, placing a white reference medium in the medium path, automatically adjusting a rank indicative of the light emission efficiency class of the two-wavelength reflecting LED array, determining the transmission/reflection accumulation time when a read medium is present is, and calculating a correction coefficient; by setting an accumulation time when there is no read medium and turning off the two-wavelength transmitting LED array and two-wavelength reflecting LED array to determine a dark output correction level when there is no read medium present, determining a dark output correction level, then turning on the two-wavelength transmitting LED array and two-wavelength reflecting LED array to determine a light emitting level, setting an accumulation time when there is a read medium present and turning off the two-wavelength transmitting LED array and two-wavelength reflecting LED array to determine a dark output correction level when a scanned medium is present, and determining a dark-output correction level and calculating a correction coefficient.

DETAILED DESCRIPTION OF THE PREFERRED EMBODIMENTS

In an image reading apparatus according to the present invention, control circuit operation (including line sensor scanning operation and sensor system variations) is the same regardless of differences and variations between image readers while the control circuit is also simplified, and complicated processes such as setting various software process parameters for absorbing differences between image readers are avoided. When a plurality of light sources of different wavelengths (such as green and infrared) are used for the light source, it is common to use the photodetector elements for detecting the transmitted light and the reflected light in common to downsize the reader. When a same photodetector element is used for a light source of a plurality of different wavelengths, the sensitivity of the photodetector element will differ according to the detected wavelength. The present invention prevents error due to sensitivity by controlling the accumulation time of photodetection by the photodetector-element.

Furthermore, an LED (light emitting diode) array is commonly used as the light source, but this LED array comprises a large number of LED elements in parallel rows with a resistor element added to a number of LED elements in series to limit current supply to the LED elements. Because variations in LED element luminance occur during manufacture, reader cost would become high due to yield concerns if only LED elements having a specific luminance rating were used. However, by selecting and ranking only LED elements within a certain tolerance range and using these according to rank to build individual LED arrays, photodetection differences can be reduced on the photodetector side. Luminance variation in a single LED array can be suppressed by selecting the individual LED elements, and thereby eliminating variation between LED arrays in the present invention.

The present invention is described in detail below with reference to the accompanying figures and using by way of example an application for identifying the banknote (bank bill).

Figure 1:
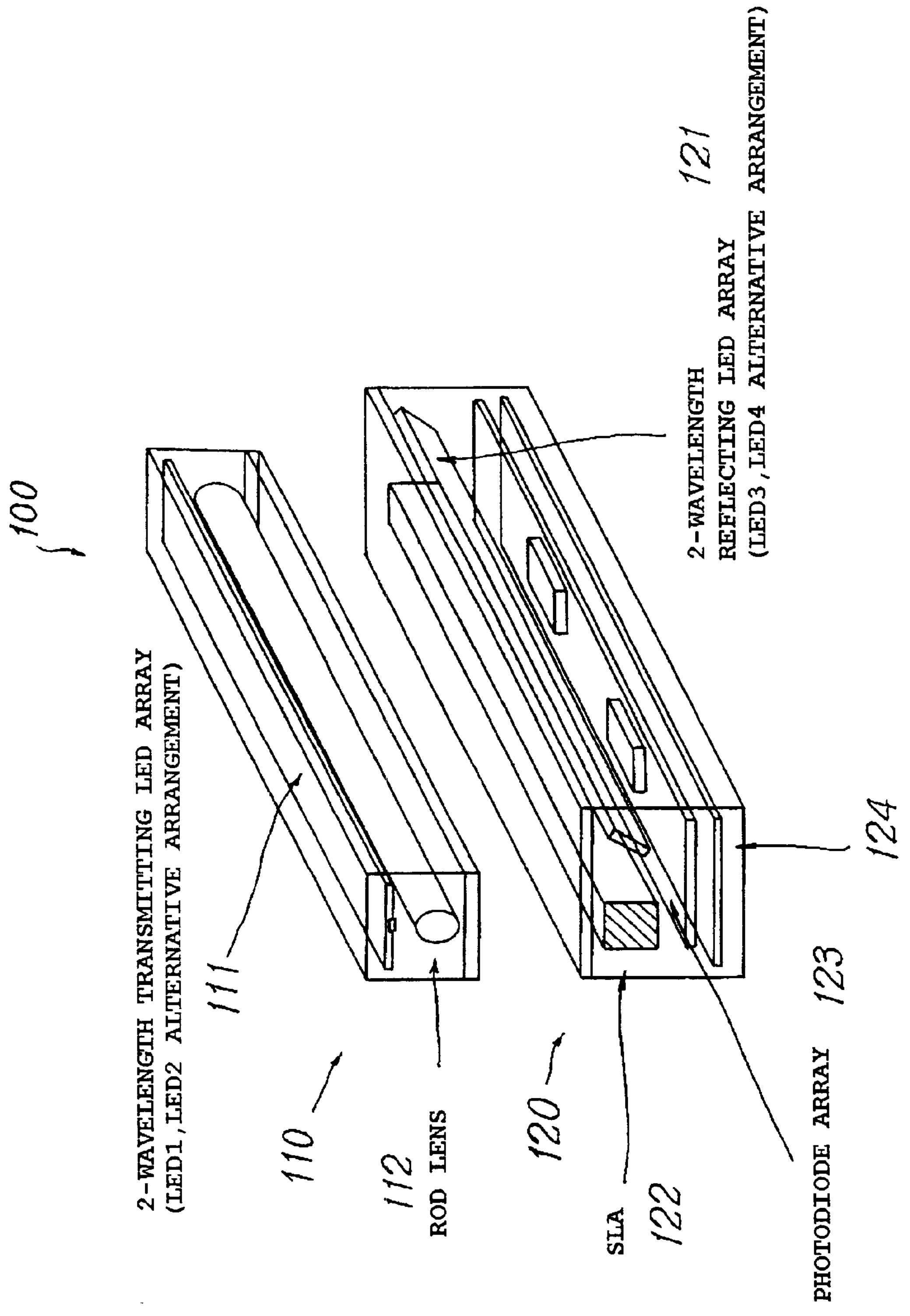
FIG. 1 shows a typical configuration of a line sensor according to the present invention.

FIG. 1 shows the configuration of a line sensor 100 according to the present invention. Disposed in the banknote identification part of a banknote identification apparatus (image reading device), the line sensor 100 comprises a long light emitting part 110 and a light emitting/photodetecting part 120; banknote, that is, the medium to be identified, passes through a banknote transport path between the light emitting part 110 and light emitting/photodetecting part 120.

The light emitting part 110 comprises a line shaped LED array 111 (comprising alternately arrayed LED 1 and LED 2) for transmitting light at two-wavelengths integrally disposed with a rod lens 112 for banknote illumination so as to uniformly illuminate banknote passing thereby.

The light emitting/photodetecting part 120 comprises integrally disposed a line shaped LED array 121 (comprising alternately arrayed LED 3 and LED 4) for reflecting light at two wavelengths, photodiode array 123 for photodetection, a SELFOC lens array (SLA) 122 for limiting the photodetection angle of the photodiode array 123, increasing directivity, and improving resolution, and a multiplexer circuit 124 for controlling the accumulation time of each element of the photodiode array 123.

The two-wavelength for the reflecting light LED array 111 for transmitted light and LED array 121 are controlled by a current controlled drive circuit; the sensor outputs of the photodiode array 123 are appropriately controlled according to the emitted wavelength by the multiplexer circuit 124 using the accumulation time and output. The LED array is commonly a combination of LED elements emitting infrared light and another visible light, such as a combination of red, green and orange. Yellow-green light is beneficial with respect to worn soiled banknote and detecting counterfeit banknote, however, because the absorption pattern of the transmitted light and reflected light differs when yellow-green light containing both wavelengths is emitted due to the relationship of yellow-green light and the color pattern of the banknote. The transmitted light and reflected light used in the present invention are therefore both infrared light (940 nm) and yellow-green light (570 nm). Considering that the two-wavelength transmitting LED array 111 and reflecting LED array 121 use the photodetection side in common, they are preferably disposed on the same line, but if disposed in two rows are preferably configured alternating-in a staggered pattern.

Figure 2:
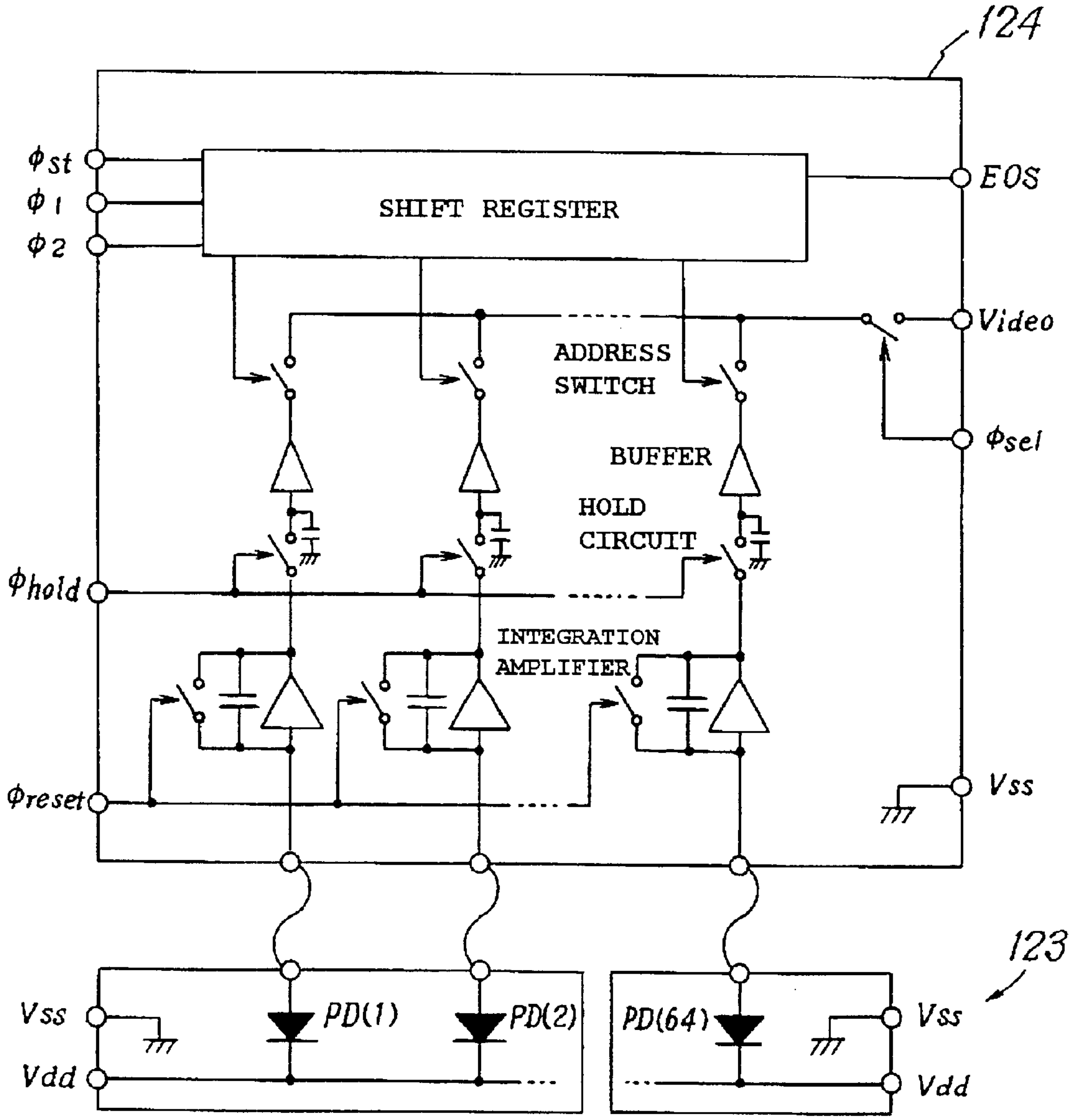
FIG. 2 shows a scanning circuit diagram of a line sensor according to the present invention.

FIG. 2 is a circuit diagram of the photodiode array 123 and multiplexer circuit 124. The photodiode array 123 comprises 64 photodiodes PD(1) to PD(64) arranged in line. Two are disposed to the banknote path, forming a 128 channel configuration. The multiplexer circuit 124 comprises integration amplifiers for integrating the each output signals from photodiodes PD(1) to PD(64); a hold circuit for holding the output values from the integration amplifiers; and address switches to which the output values held by the hold switches are inputted by way of a buffer. The address switches are sequentially switched by the shift register so that the values passed thereto are outputted as a video signal. When $\phi$reset is high H (inactive), the integration amplifier integrates the charge applied thereto; when $\phi$reset is low L (active), the charge is discharged and the integrated value goes to zero. When $\phi$hold is applied, the hold circuit holds the integrated value from the integrating amplifier.

When thus comprised, the banknote passing a banknote passage between the light emitting part 110 and the light emitting/photodetecting part 120 is perpendicularly illuminated by light from the two-wavelength transmitting LED array 111 passing through a rod lens 112. Transmitted light and reflected light from the banknote are guided by SELFOC lens array 122 to photodiode array 123 (PD(1) to PD(64)). Outputs from the photodiode array PD(1) to PD(64) are inputted to a corresponding integration amplifier of the multiplexer circuit 124 and integrated as long as ϕreset is high H (that is, the accumulation time). The values integrated by each integration amplifier are sequentially outputted as a video signal through the hold circuits, buffers and address switch.

Figure 3:
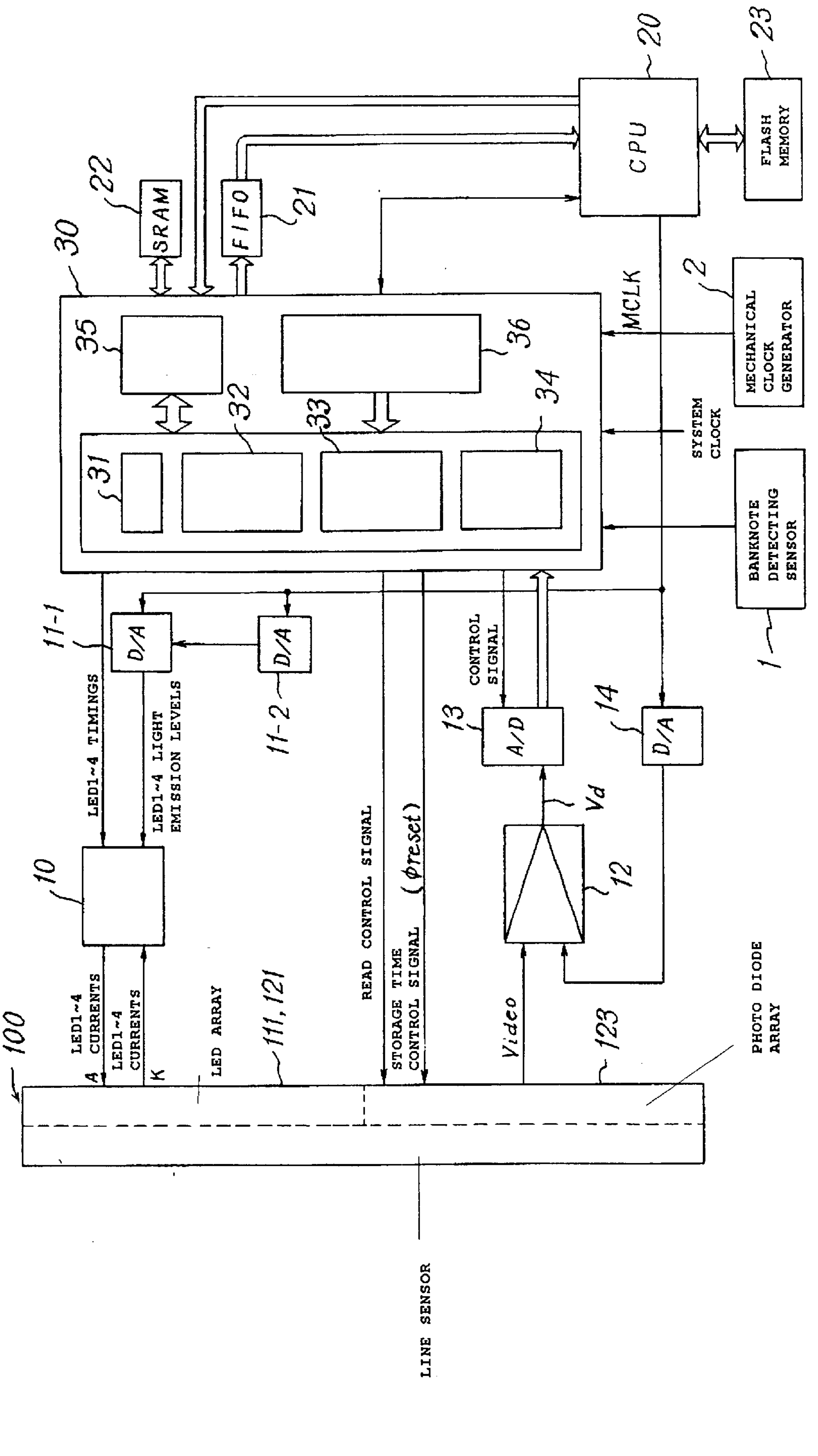
FIG. 3 is a block diagram showing an exemplary circuit diagram according to the present invention.

FIG. 3 is a block diagram of an exemplary circuit construction of the present invention whereby photodiode array 123 of line sensor 100 is controlled by means of a CPU 20 and a dedicated controller 30 to sequentially switch and repeatedly detect on a time sharing basis transmitted infrared light and yellow-green light, and reflected infrared light and yellow-green light. The two-wavelength transmitting LED array 111 and two-wavelength reflecting LED array 121 are disposed in opposition with the banknote path therebetween; a variable rated current circuit 10 operated by V/I conversion current controls the two-wavelength transmitting LED array 111 (LED 1, LED 2) and the two-wavelength reflecting LED array 121 (LED 3, LED 4). A D/A converter 11 converts a control current value from the CPU 20 to a multilevel (256×256 levels in this preferred embodiment) light emitting level, which is inputted with a timing signal from the dedicated controller 30 to the variable rated current circuit 10. Flash memory 23 is connected to the CPU 20.

The dedicated controller 30 outputs a timing signal specifying when to flow current to which LED by means of a built in sequencer 31 and sensor A/D controller 32. The sequencer 31 and sensor A/D controller 32 are a timing generator generating a timing signal controlling light emission by LEDs 1 to 4, and operation of the photodiode array 123 co-operating with LEDs 1 to 4. Because LEDs 1 to 4 operate at multiple light emission levels (256×256 in this preferred embodiment), the D/A converter 11 is used to appropriately select the light emission level.

The dedicated controller 30 internally further comprises a sensor A/D controller 32 for controlling an A/D converter 13; an storage time counter 33 for controlling the storage time (ϕreset) by counting a system clock (32 MHz, for example) from an accumulation time set by the operating parameter setting part 36; an arithmetic operator 34 for performing a correction operation using the raw data converted by an A/D converter and the correction coefficient set in an SRAM 22; a bus controller 35 for controlling internal and external bus lines; and an operating parameter setting means 36. A system clock, detection signal from a banknote detecting sensor 1, and mechanical clock MCLK from a mechanical clock generator 2, are inputted to the dedicated controller 30.

The photodiode array 123 is controlled by a read control signal from the dedicated controller 30 causing each channel from the 64 photodiodes PD(1) to PD(64) to be read. The read control signals are a read clock, a read start signal (ϕst), and a hold signal (ϕhold); the read clock (1 MHz) is obtained by frequency dividing the system clock. When ϕreset of the multiplexer circuit 124 is not high H, that is, the storage time control signal is outputted from the dedicated controller 30, the charge accumulated only while ϕhold is low L (active) is outputted to the hold circuit, and the read signals from the photodiodes PD(1) to PD(64) are outputted at a stable voltage. The read signals from the photodiodes PD(1) to PD(64) are sequentially selected by the address switches of the multiplexer circuit 124 and output one channel at a time with the output signal Video inputted to differential amplifier 12.

The differential amplifier 12 amplifies the difference signal obtained by the D/A converter 14 controlled by the CPU 20 subtracting an offset value from the output signal Video from the photodiode array 123, and outputs the resulting amplified difference signal Vd to the A/D converter 13. The A/D converter 13 is controlled by the sensor A/D controller 32 in the dedicated controller 30, and the A/D converted digital value is inputted to the dedicated controller 30.

The offset value outputted by the D/A converter 14 is sent from the CPU 20 so that the lowest value in one line is not negative and is within a specific range. The analog value D/A converted by the D/A converter 14 is inputted to the differential amplifier 12, and the output Vd thereof is input to A/D converter 13 for A/D conversion. The conversion timing of the A/D converter 13 is controlled by the A/D control signal sent from the sensor A/D controller 32 so that each channel is sampled once.

There is variation (due to differences in illumination rank) in the light emission level of LEDs 1 to 4 at the same current. However, by controlling the reference voltage of D/A converter 11-1 by means of the D/A converter 11-2 (the output of the D/A converter 11-2 is the reference voltage of the D/A converter 11-1), the differences in the emitted luminance of LED array 1–4, that is, emission sensitivity, at the same current setting of the D/A converter 11-1 can be compensated. As a result, the change amount in luminance in the LED array for one D/A conversion can be made constant.

The digital value for each channel of the photodiodes array PD(1) to PD(64) A/D-converted by the A/D converter 13 is inputted to the dedicated controller 30, written through the dedicated controller 30 to an FIFO memory 21, and read therefrom by the external CPU 20. The SRAM 22 is provided as working RAM for the dedicated controller 30, but can be accessed by the CPU 20 only when the dedicated controller 30 is not operating, in which case the CPU 20 accesses the SRAM 22 through the dedicated controller 30. The reason for providing the FIFO memory 21 and the SRAM 22 is that SRAM 22 primarily stores data used for gate array operations, and data that must be read as a result by the CPU 20is stored to the FIFO memory 2l. The FIFO memory 21 stores dark output and shading corrected data of four wavelengths (two transmission wavelengths and two reflected wavelengths), pixel ratio calculated data of each transmission and reflection wavelength, and banknote edge information; the SRAM 22 stores data for dark output correction, shading correction data, banknote edge detection threshold data, and dark output and shading corrected data.

Figure 4:
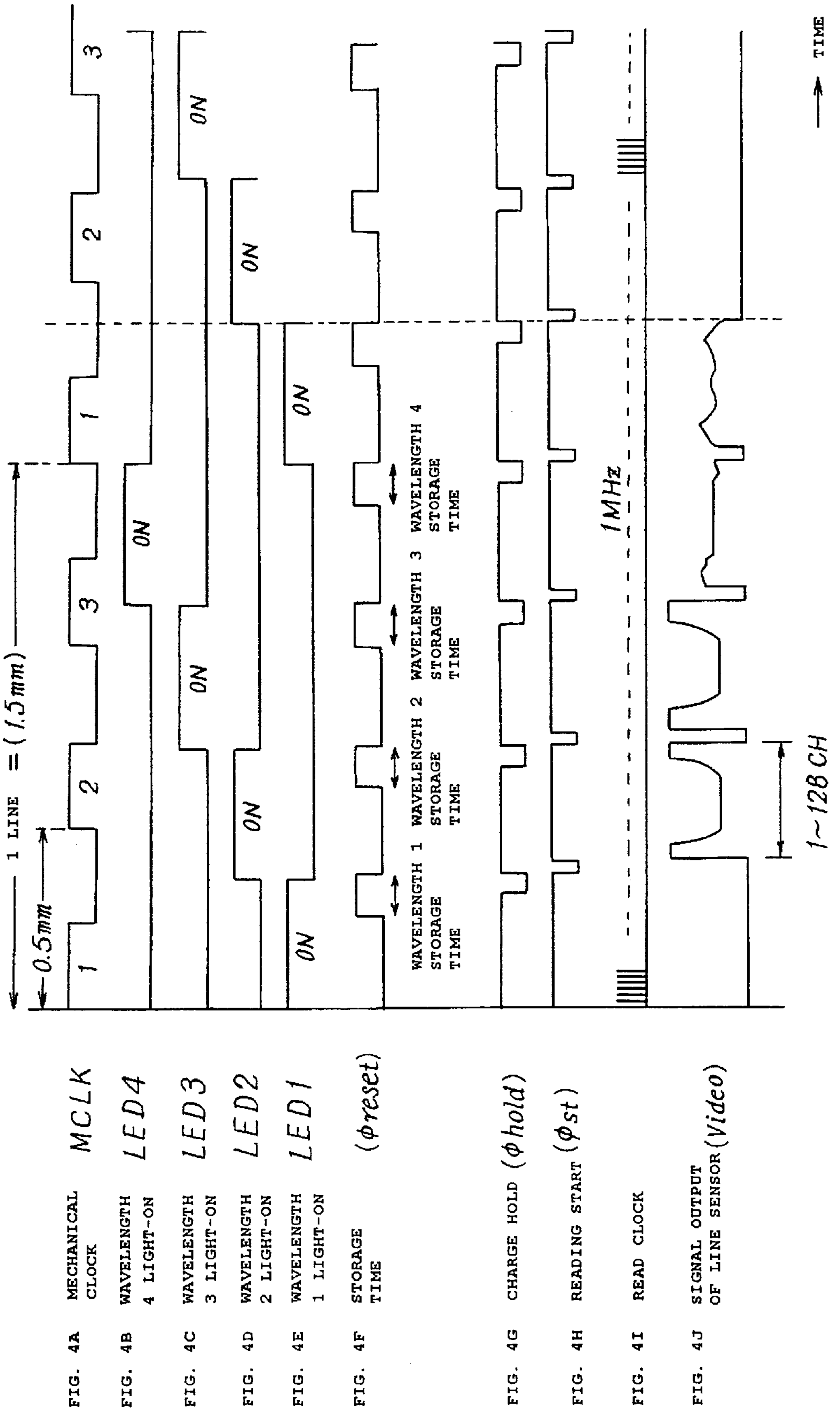
FIGS. 4A to 4J are timing charts describing the operation of the present invention.

FIGS. 4A to 4J are timing charts describing an exemplary operation of the present invention, FIG. 4A showing the mechanical clock MCLK for banknote feed rate synchronization 1 line shows the scan for every 1.5 mm of transporting; and 4B, 4C, 4D, and 4E showing the on states of LED 4, LED 3, LED 2 and LED 1 emitting at wavelength 4 (570 nm reflection), wavelength 3 (940 nm reflection), wavelength 2 (570 nm transmission) and wavelength 1 (940 nm transmission), respectively. FIG. 4F shows the accumulation time (ϕreset) timing, FIG. 4G shows the charge hold (ϕhold) timing, FIG. 4H shows the photodiode array 123 reading start (ϕst) timing, FIG. 4I shows the 1 MHz read clock, and FIG. 4J shows the channel output Video for one line of the line sensor 100. In other words, three pulses of the mechanical clock MCLK are inputted for one line, scanning that is one line is scanned for every three input pulses. As the LED 1–4 are time sharing controlled to light at different wavelengths, charge accumulation time is allocated according to emission by the LED 1 to 4 so that the charge is integrated by the integration amplifiers. The storaged charge of the LED 1 to 4 is held by the holding circuits, and sequentially read synchronized to the read clock timed to the read start signal (ϕst). The signal Video output from the multiplexer circuit are as shown in FIG. 4J.

Figure 5:
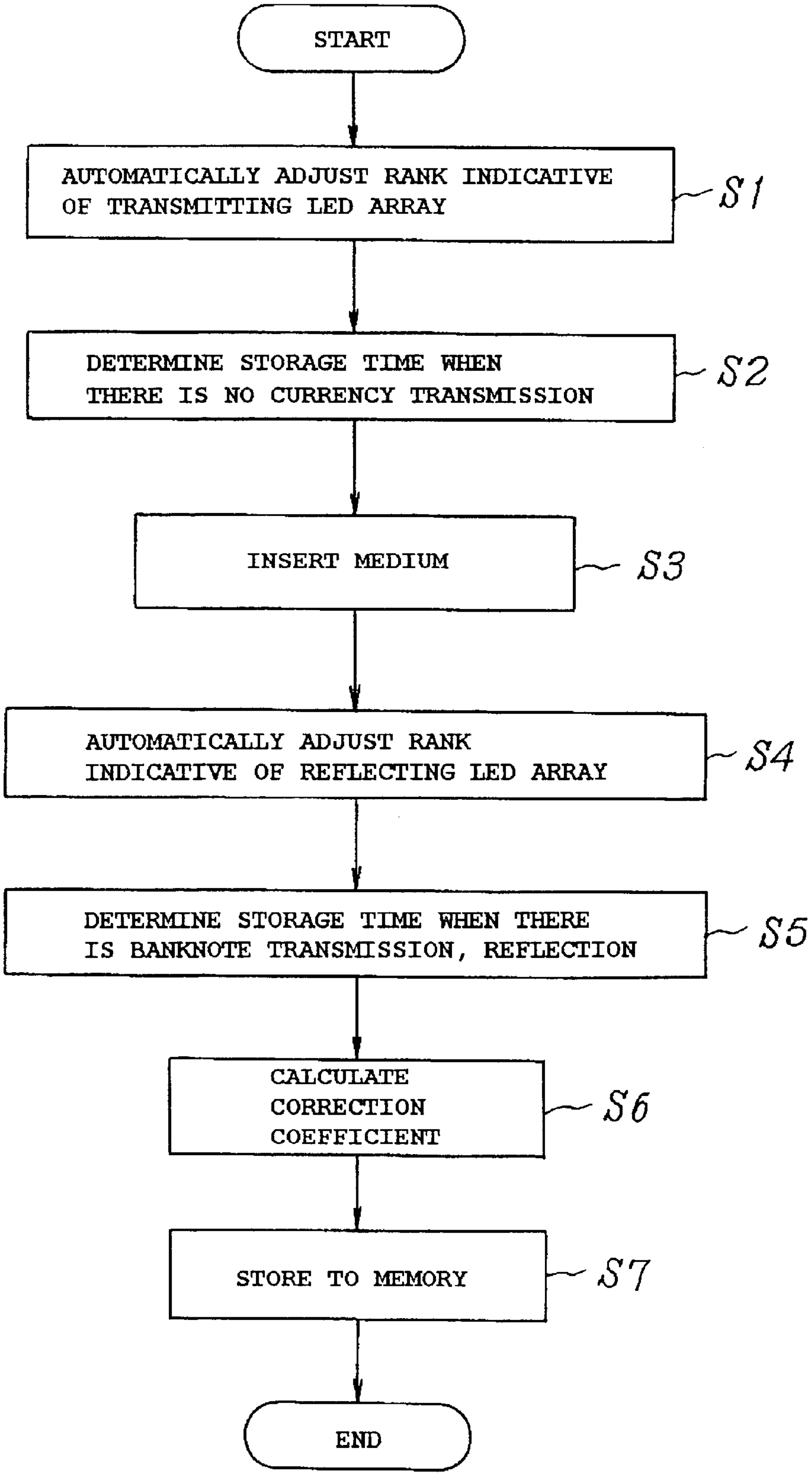
FIG. 5 is a flow chart showing a typical process for line sensor adjustment (setting the accumulation time)

FIG. 5 shows the line sensor 100 adjustment (setting the storage time). First, a rank indicative of the emission efficiency class of two-wavelength transmitting LED array 111, that is, the reference voltage of the D/A converter 11-1 outputted from the D/A converter 11-2, is automatically adjusted (Step S1). This is accomplished by setting the (light-dark) level when there is no banknote constant with the storage time and the D/A converter 11-1 control value (D/A level) constant. Next, the accumulation time when there is no banknote transmission is adjusted with the LED array current constant and the (light-dark) level when there is no banknote constant (Step S2). Next, a white reference sheet medium is inserted to the banknote transport portion of the line sensor 100 (Step S3). When the reflection sensor is normally in standby there is no reflection even if the LED emits because there is no reflecting medium. This white reference sheet medium is therefore inserted to detect reflection from an unsoiled reference medium. Photodetection of banknotes of various countries is shown in the following Table 1 in hexadecimal notation.

TABLE 1

| | Italy banknote (lira) | France banknote (franc) | Philippines banknote (peso) | U.S.A. banknote (dollar) |
|---|---|---|---|---|
| Transmitted infrared | C0 | 80 | A0 | 90 |
| Transmitted yellow-green | C0 | 90 | C0 | D0 |
| Reflected infrared | C0 | C0 | C0 | E0 |
| Reflected yellow-green | C0 | C0 | C0 | E0 |

(hexadecimal)

Figure 6:
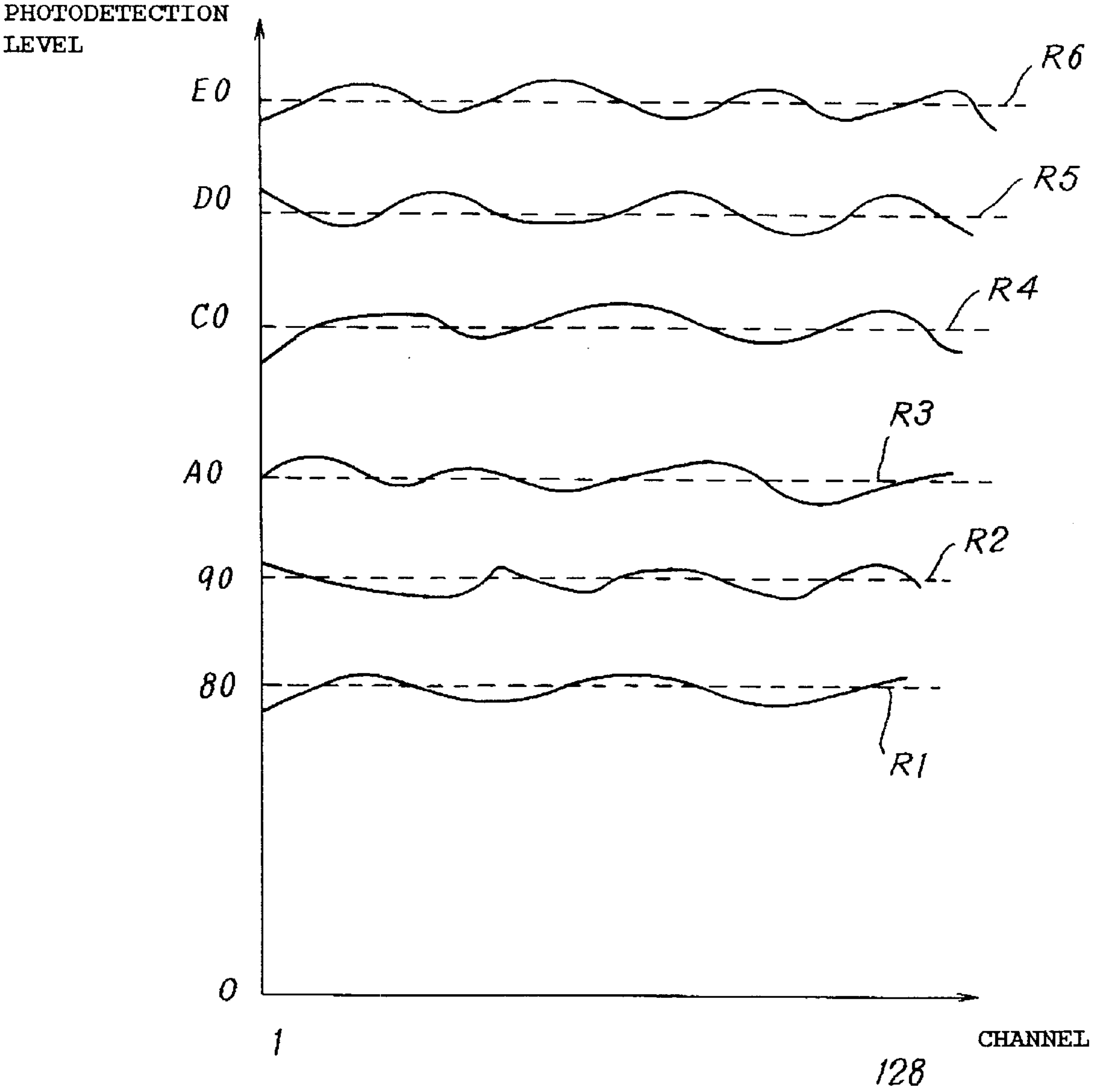
FIG. 6 shows the characteristics of banknote from various countries.

The photodetection levels shown in Table 1 appear as indicated by the solid lines in FIG. 6 when graphed for each channel (1–128), and differences in transmitted and reflected light occur as a result of differences in, for example, the quality of paper of each country banknote. As a result, the adjustment level is set for each country using a white reference medium while the dynamic range of the sensor is common. The dotted lines R1 to R6 in FIG. 6 indicate the reference adjustment levels.

Next, a rank indicative of the emission efficiency class of two-wavelength LED array 121 for reflecting light, that is, the reference voltage of the D/A converter 11-1 outputted from the D/A converter 11-2 outputted from the D/A converter 11-2, is automatically adjusted (Step S4). This is accomplished by setting the (light-dark) level when there is banknote constant with the storage time and the D/A converter 11-1 control value (D/A level) also constant. The transmission and reflection (two-wavelengths each) storage time in the presence of banknote, are then determined (Step S5). The condition for accomplishing this is a constant LED array banknote value (LED array current value based on the above determined rank value) and constant (light-dark) level when banknote is present.

Next, correction coefficients such as a reference correction coefficient for each channel, an adjustment correction reference value for 4 wavelengths×128 channels when there is no banknote, and a transmission/reflection use ratio coefficient when there is banknote, are calculated so that output using a white reference paper is constant for 4 wavelengths×128 channels when banknote is present (Step S6). These adjustment values (storage time when there is banknote, storage time when there is no banknote, LED array ranks value) and correction values (reference correction value, adjustment correction reference value, use ratio coefficient) are then stored to the flash memory 23 (Step S7).

Figure 7:
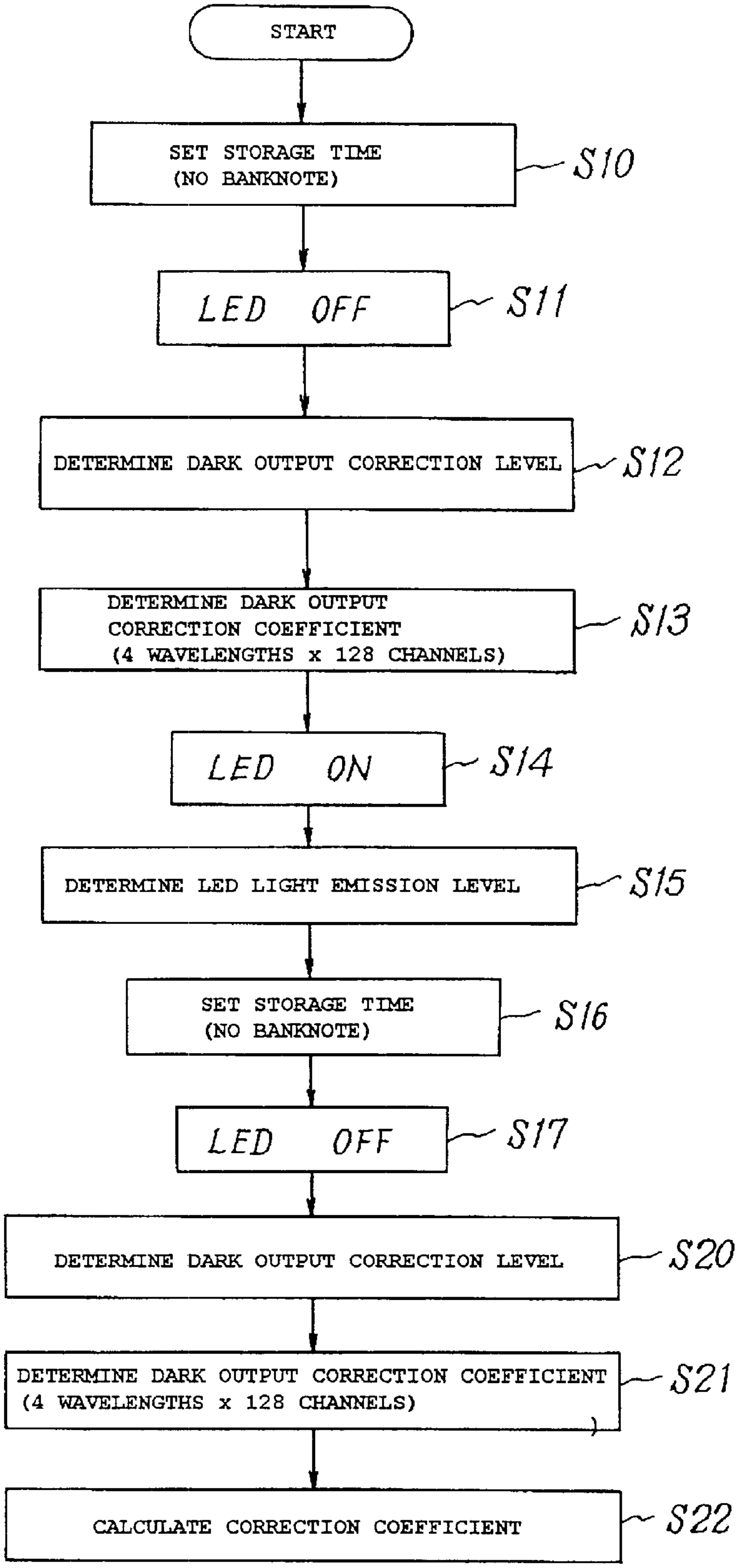
FIG. 7 is a flow chart showing a typical process for a control operation (scanning operation) of a line sensor.

FIG. 7 shows an exemplary control procedure (reading operation) for the line sensor 100. First, the no-banknote storage time is read from the flash memory 23 and set to the operating parameter setting part 36 in the dedicated controller 30 (Step S10). The LED 1 to 4 are then turned off (Step S11). The dark output correction level (control value of the D/A converter 14) with no banknote is determined, and the dark output correction coefficient for 4 wavelengths×128 channels is stored to the SRAM 22 (Step S12). The LED 1 to 4 are then turned on (Step S14). Next, the LED light emission levels (256 levels: D/A converter 11-1 output) are determined with a constant light-dark setting (Step S15). The storage time with banknote present is read from the flash memory and set (Step S16), and the LED 1 to 4 are then turned off (Step S17). Next, after determining the dark output correction level (control value of the D/A converter 14) with banknote present (Step S20), the dark output correction for 4 wavelengths×128 channels is stored to the SRAM22 (Step S21). Next, it is changed to a normal banknote identification mode.

It should be noted that while described with reference to banknote above, the present invention can also be applied in the same manner with media such as checks. Furthermore, while LEDs are used as the light emitting elements, other elements can be obviously used. In addition, while two transmission wavelengths and two reflection wavelengths are described above, it is possible to process any other number of transmission and reflection wavelengths.

As described above, the difference in efficiency of a photodetector and light emitting element is absorbed in the present invention by the storage time of the sensor when two light sources of different wavelengths and different emission efficiency are detected by a single photodetector in which sensitivity differs according to wavelength. It is therefore only necessary to control the accumulation time, the circuit configuration can thus be simple, and photodetector operation is not affected by differences in the photodetection circuit.

Further, the present invention is also compatible with various media (currencies of different countries) having different light transmission and reflection characteristics. By running the setup process at the start of an identification operation, setting values for correcting such variations and setting parameters for the identification process are completed, and reading accuracy can be improved and stable.

Furthermore, because sensitivity differences and variations in light quantity due to wavelength are adjusted by the accumulation time, signal processing can be accomplished with an analog/digital process, a common signal processing system can be used, and cost can be reduced.

While adjusting and setting the accumulation time are accomplished during the initial adjustment (at product shipping), media can be identified with good results even when operation is affected by temperature, aging, and other environmental changes because operation is controlled by the emission level of the light emitting elements.

When accumulation time control is not used, it is necessary to change the photodetection amplifier gain to 1:10 or even 1:100 considering differences in wavelength sensitivity with different detection media. However, by using accumulation time control according to the present invention, the amplification gain of the photodetection circuit can be kept constant, and a common circuit offset and A/D conversion bit weighting can be used. If gain is increased the offset of a preceding circuit is simultaneously amplified, but this is not a problem because they are the same circuit.

What is claimed is:

1. An image reading apparatus having a multiple wavelengths light sources comprising a line shaped, two-wavelength transmitting LED array for transmitting light;

a line shaped light emitting and photodetecting part comprising a photodetector array and a two-wavelength LED array for reflecting light disposed in opposition such that a scanned medium passes between the two-wavelength transmitting LED array and light emitting and photodetecting part, said two-wavelength reflecting LED array emitting light of different wavelengths;

a storage time control circuit disposed in a signal processing circuit of the photodetector array; and a control means for controlling light emission by the two-wavelength transmitting LED array and the two-wavelength reflecting LED array, so that one wavelength LEDs in one of the two LED arrays are lit at one time, thereby controlling reading by the photodetectors, and controlling the storage time control circuit;

wherein variations in wavelength detection sensitivity and light quantity with different read media are adjusted by means of the storage time of the storage time control circuit.

2. An image reading apparatus as claimed in claim 1, wherein said storage time adjustment is accomplished automatically.

3. An image reading apparatus as claimed in claim 1, wherein said two wavelengths are infrared light and yellow-green light.

4. An image reading apparatus as claimed in claim 1, wherein said two-wavelength transmitting LED array and said two-wavelength reflecting LED array are disposed on a same line.

5. An image reading apparatus using multiple wavelengths light sources having a line shaped, two-wavelength transmitting LED array and a line shaped light emitting/photodetecting part comprising a photodetector array and a two-wavelength LED array for reflecting light disposed in opposition each other such that a read medium passes between said two-wavelength LED array for transmitting light and said light emitting/photodetecting part, comprising:

a signal processing circuit for controlling an storage time of the photodetector array when the two-wavelength transmitting LED array and two-wavelength reflecting LED array emit light of different wavelengths.

6. An image reading apparatus an claimed in claim 5, wherein a SELFOC lens array is provided at a front of said two-wavelength reflecting LED array.

7. A control method for an image reading apparatus having a line shaped, a two-wavelength transmitting LED array and a line shaped light emitting/photodetecting part comprising a photodetector array and a two-wavelength reflecting LED array disposed in opposition each other such that a read medium passes between the two-wavelength transmitting LED array and light emitting/photodetecting part, and a signal processing circuit for controlling an storage time of the photodetector array when the two-wavelength transmitting LED array and two-wavelength reflecting LED array emit light of different wavelengths, wherein:

an storage time when there is no read medium is determined after an automatic adjustment for correcting a light emitting luminance rank of the two-wavelength transmitting LED array, a white reference medium is placed in the medium path and a light emitting luminance rank of the two-wavelength reflecting LED array is automatically adjusted, and a LED emitting time for transmission/reflection when a read medium is present is determined, and a correction coefficient is calculated.

8. A control method for an image reading apparatus having a line shaped, two-wavelength LED array for transmitting light and a line shaped light emitting/photodetecting part comprising a photodetector array and a two-wavelength LED array for reflecting light disposed in opposition each other such that a read medium passes between the two-wavelength LED array for transmitting light and light emitting/photodetecting part, and a signal processing circuit for controlling an storage time of the photodetector array when said two-wavelength LED array for transmitting light and said two-wavelength LED array for reflecting light emit light of different wavelengths, wherein:

an storage time when there is no read medium is set and said two-wavelength transmitting LED array and said two-wavelength LED array for reflecting light are turned off to determine a dark output correction level when there is no read medium present, a dark output correction level is determined, said two-wavelength transmitting LED array and said two-wavelength reflecting LED array are turned on to determine a light emitting level, a storage time when there is a read medium present is set and said two-wavelength LED array for transmitted light and two-wavelength LED array for reflecting light are turned off to determine a dark output correction level when a read medium is present, and a dark output correction level is determined and correction coefficient is calculated.

9. An image reading apparatus having multiple wavelengths light sources comprising:

a transportation means for transporting a read medium between a line shaped, a two-wavelength transmitting LED array and a line shaped light emitting/photodetecting part comprising a photodetector array and a two-wavelength reflecting LED array;

a light emitting means for driving said two-wavelength LED array for transmitting light and said two-wavelength LED array for reflecting light to emit light at different wavelengths;

an storage time control circuit disposed in a signal processing circuit of the photodetector array for integrating a photoelectric charge for a specific time; and a control means for controlling light emission by said two-wavelength LED array for transmitting light and said two-wavelength LED array for transmitting light, controlling reading by said photodetectors, and controlling the storage time control circuit;

wherein the control means comprises a target output table for setting said storage time according to the reflectivity and the transmittance of the read medium at each different wavelength, and said storage time is set to achieve a specific output value according to a value from the target output table.

10. An image reading apparatus having a multiple wavelengths light sources, comprising:

a line shaped and two-wavelength LED array for emitting light to obtain transmitted light;

a line shaped light emitting and photodetecting unit including a two-wavelength reflective LED array for emitting light to obtain reflected light and a photodetector array for obtaining both transmitted and reflected light disposed in opposition to said two-wavelength LED array so that a sheet to be scanned can passes between said two-wavelength LED array and said light emitting and photodetecting unit;

a charge storage time control circuit disposed in a signal processing circuit of the photodetector array for controlling charge storage time to compensate the difference of sensitivity of the photodetector according to the difference of wavelengths of the received light and the varieties among light emitting quantity of said LED arrays; and a control means for controlling light emission of said two wavelength LED array and two-wavelength reflective LED array so that one wavelength LED in one of the two LED arrays are lit at one time, thereby controlling reading of said photodetectors, and controlling said charge storage time control circuit, wherein variations in wavelength detection sensitivity and light quantity with different read media are adjusted by means of the storage time of the storage time control circuit.

11. An image reading apparatus as claimed in claim 10, wherein said charge storage times are determined according to the wavelength of received light, the light quantity when a sheet is present between said two wavelength LED arrays and said light emitting and photodetecting unit, the reflected light properties of the sheet, the light transmissivity properties of the sheet or the light emission level of each wavelength LEDs in one of the two LED arrays.

12. An image reading apparatus as claimed in claim 10, wherein said charge storage time adjustment is accomplished automatically.

13. An image reading apparatus as claimed in claim 10, wherein one wavelength LED is disposed alternatively with the other wavelength LED in said arrays.

14. An image reading apparatus as claimed in claim 10, wherein said two-wavelength LED array and said two-wavelength reflective LED array are disposed in parallel.

15. An image reading apparatus as claimed in claim 10, wherein said two wavelengths are wavelengths of infrared light and yellow-green light.

16. An image reading apparatus as claimed in claim 10, wherein a SELFOC lens array is provided along the front of said photodetector array in said line shaped light emitting and photodetecting unit.

17. An image reading apparatus as claimed in claim 10, wherein a lodlens is provided along the front of the line shaped and two-wavelength LED array for emitting light to obtain transmitted light.

18. A control method for an image reading apparatus having a line shaped, two-wavelength LED array for emitting light to obtain transmitted light and a line shaped light emitting and photodetecting unit, comprising:

a photodetector array and a two-wavelength reflective LED array for emitting light to obtain reflected light, disposed in opposition to each other such that a sheet to be scanned passes between said two-wavelength LED array and said light emitting and photodetecting unit; and a signal processing circuit for controlling a charge storage time of the photodetector array when said two-wavelength LED array and said two-wavelength reflective LED array emit the light of difference wavelengths, wherein:

when there is no sheet to be scanned, a charge storage time is determined after an automatic adjustment for correcting a light emitting luminance rank of said two-wavelength LED array;

a white reference sheet is placed in the sheet path and a light emitting luminance rank of said two-wavelength reflective LED array is automatically adjusted; and when a sheet to be scanned is present, an LED emitting time to obtain transmitted or reflected light is determined, and a correction coefficient is calculated.

19. A control method for an image reading apparatus having a line shaped, two-wavelength LED array for emitting light to obtain transmitted light and a line shaped light emitting and photodetecting unit, comprising:

a two-wavelength reflective LED array for emitting light to obtain reflected light;

a photodetector array for obtaining both transmitted and reflected light, disposed in opposition to each other such that a sheet to be scanned passes between said two-wavelength LED array and said light emitting and photodetecting unit; and a signal processing circuit for controlling a charge storage time of the photodetector array when said two-wavelength LED array and said two-wavelength reflective LED array emit light of difference wavelengths, wherein:

when there is no sheet, a charge storage time is set and said two-wavelength LED array and said two-wavelength reflective LED array are turned off to determine a dark output correction level;

said two-wavelength LED array and said two-wavelength reflective LED array for obtaining reflective light are turned on to determine a light emitting level;

a charge storage time is set when a sheet is present; and the two-wavelength reflective LED array is turned off to determine a dark output correction level when a sheet is present; and a dark output correction level is determined and correction coefficient is calculated.

20. An image reading apparatus having multiple wavelengths light sources, comprising:

a transportation means for transporting a sheet to be scanned between a line shaped, two-wavelength LED array for emitting light to obtain transmitted light and a line shaped light emitting and photodetecting unit comprising a two-wavelength reflective LED array for emitting light to obtain reflected light and a photodetector array for obtaining both transmitted and reflected light;

a light emitting means for driving said two-wavelength LED array and said two-wavelength reflective LED array to emit light at different wavelengths;

a charge storage time control circuit disposed in a signal processing circuit of said photodetector array for integrating photoelectric charge for a specific time; and control means for controlling light emission of said two-wavelength transmitting LED array and said two-wavelength reflective LED array, thereby controlling reading by said photodetectors, and controlling the charge storage time control circuit, wherein the control means comprises a target output table for setting said charge storage time according to the reflectivity and the transmittance of the sheet to be scanned at each different wavelength; and said charge storage time is set to yield a specified output value according to a value from a target output table.

* * * * *